UNITED STATES PATENT OFFICE.

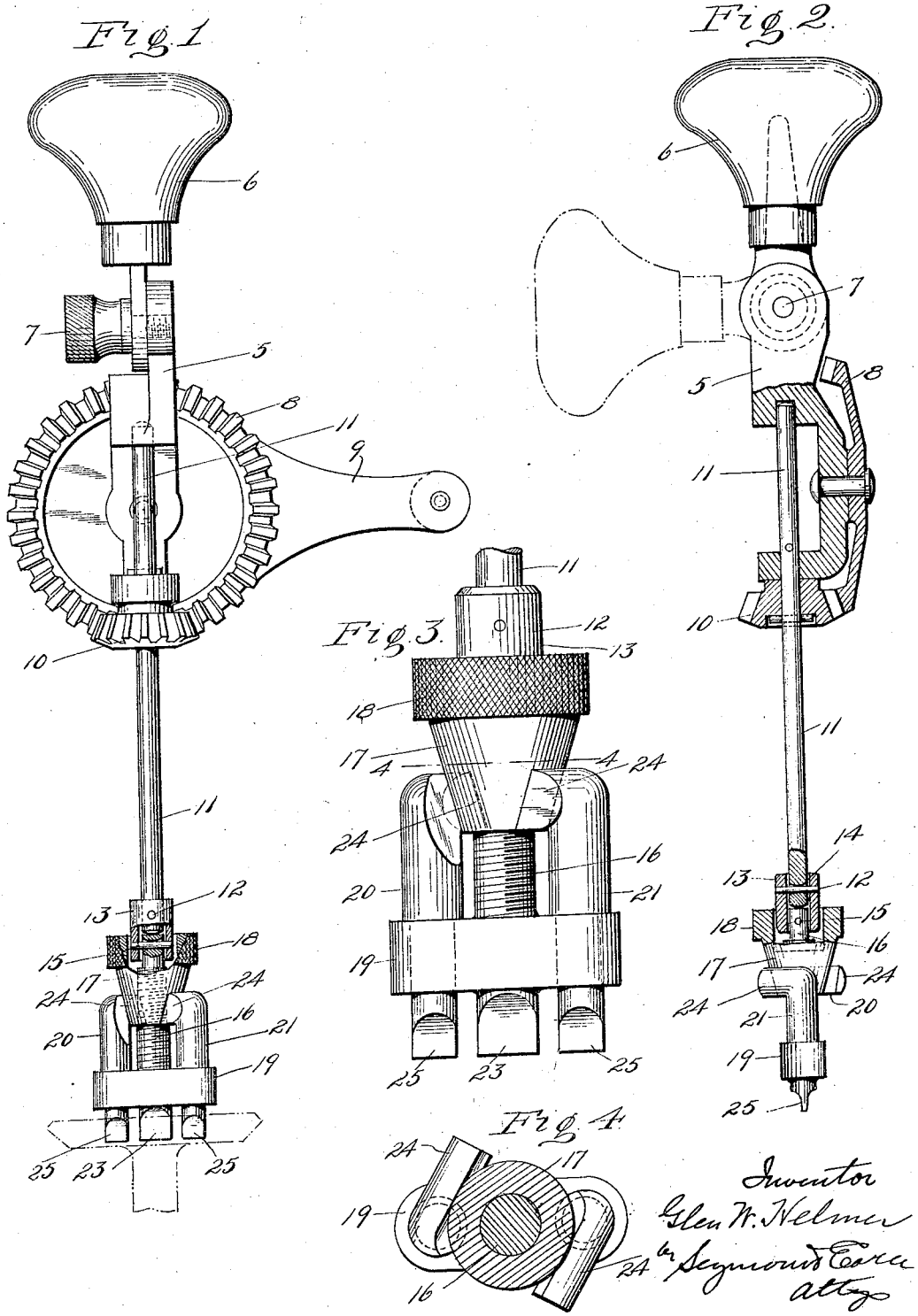

GLEN W. HELMER, OF ILION, NEW YORK.

VALVE-GRINDING TOOL.

1,419,628.         Specification of Letters Patent. Patented June 13, 1922.

Application filed June 6, 1921. Serial No. 475,238.

*To all whom it may concern:*

Be it known that I, GLEN W. HELMER, a citizen of the United States, residing at Ilion, in the county of Herkimer and State of New York, have invented a new and useful Improvement in Valve-Grinding Tools; and I do hereby declare the following, when taken in connection with the accompanying drawings and the characters of reference marked thereon, to be a full, clear, and exact description of the same, and which said drawings constitute part of this application, and represent, in—

Fig. 1, a face view, partly in section, of a valve grinding tool constructed in accordance with my invention.

Fig. 2, a side view, also partly in section, of the same.

Fig. 3, a side view on an enlarged scale, of the lower end of the tool.

Fig. 4, a sectional view, on the line 4—4, of Figure 3.

This invention relates to improvement in valve grinding tools, and particularly to that type which operate on the manner of a breast-drill, the object of the invention being to provide a valve grinding tool which will be operable in a variety of positions and firmly grip the valve being ground, so that it may be withdrawn when desired, and the invention consists in the construction hereinafter described and particularly recited in the claim.

In carrying out my invention, I employ a head 5 to which is adjustably connected a gripping-handle 6 which is secured to the head by a clamp-screw 7, so that it may be turned at various positions with relation to the head. Mounted on one side of the head is a beveled gear 8 provided with a crank-handle 9 by which it may be oscillated, and this beveled gear 8 meshes with a beveled pinion 10 having a bearing against the under face of the head, and pinned to a spindle 11, which is supported at its upper end in the head. The lower end of the spindle is connected by a pin 12 with a coupling-sleeve 13 and the hole 14, in the spindle through which the pin 12 passes, is enlarged at its ends and the spindle is slightly smaller in diameter than the internal diameter of the sleeve, so as to have a slight rocking movement with relation thereto. Secured to the lower end of the sleeve, at right angles to the pin 12 and upon a pin 15, is a tool-shank 16 threaded for engagement by a nut 17 formed with a knurled collar 18. The hole for the pin 15 is also enlarged at its ends to provide for slight rocking movement, thus giving the effect of a universal joint. The tool-shank 16 is formed with a cross-bar 19, below which the lower end 23 of the tool-shank 16 extends. Mounted in the cross-bar 19 are rotatable jaws 20 and 21, the pivotal axes of which are parallel to the spindle. The jaws are provided at their upper ends with arms 24 which project laterally and tangentially and bear against the tapered surface of the nut 17, so that, when the nut 17 is turned downward, the arms will be separated so as to partially rotate the jaws and turn the ends 25 with relation to the end 23, and consequently bring them into firm frictional engagement with the top of a valve head.

It is obvious that various means may be employed to turn the spindle, such, for instance, as a bit-brace or breast-drill.

The jaws are engaged with the valve head by turning the nut, and this nut is in convenient position to be turned by the operator, so that the tool may be engaged or disengaged with the valve head, and when engaged the valve head may be lifted from its seat.

I claim:

A valve-grinding tool, comprising a head, a spindle mounted in said head, means for turning said spindle, a tool shank connected with said spindle, an externally-tapered nut mounted on said shank, and a pair of jaws mounted in the said shank, the pivotal axes of which are parallel to the spindle, the upper ends of the jaws formed with laterally and tangentially projecting arms, the sides of which bear upon the tapered surface of the nut, whereby, as the nut is moved up or down, the jaws will be caused to turn.

In testimony whereof, I have signed this specification in the presence of two subscribing witnesses.

GLEN W. HELMER.

Witnesses:
    FREDERIC C. EARLE,
    MALCOLM P. NICHOLS.